United States Patent
Zhang et al.

(10) Patent No.: US 10,031,514 B2
(45) Date of Patent: Jul. 24, 2018

(54) METHOD FOR SERVO LOCKING CONTROL AND SERVO

(71) Applicant: UBTECH Robotics Corp., Shenzhen (CN)

(72) Inventors: Lifu Zhang, Shenzhen (CN); Tingshuang Huang, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/373,486

(22) Filed: Dec. 9, 2016

(65) Prior Publication Data

US 2018/0011478 A1    Jan. 11, 2018

(30) Foreign Application Priority Data

Jul. 8, 2016  (CN) .......................... 2016 1 0544019

(51) Int. Cl.
  *G05B 11/01*    (2006.01)
  *G05B 19/414*   (2006.01)

(52) U.S. Cl.
  CPC .. *G05B 19/414* (2013.01); *G05B 2219/34013* (2013.01)

(58) Field of Classification Search
  CPC .... G05B 19/19; G05B 19/416; G05B 19/232; G05B 7/003; G11B 19/28

USPC ............... 318/560, 561, 567, 568.16, 568.17
  See application file for complete search history.

(56) References Cited

U.S. PATENT DOCUMENTS

| | | | | |
|---|---|---|---|---|
| 4,864,508 A * | 9/1989 | Iwagaya | .............. | G05B 19/232 318/632 |
| 5,180,956 A * | 1/1993 | Oaki | ........................ | B25J 9/163 318/561 |
| 5,612,602 A * | 3/1997 | Kubota | ................ | G05B 19/237 318/560 |
| 5,886,491 A * | 3/1999 | Yoshida | ............... | G05B 13/024 318/568.17 |
| 6,379,042 B1 * | 4/2002 | Polkus | .................. | A61B 6/105 318/466 |
| 8,523,765 B2 * | 9/2013 | Kawai | ................. | A61B 1/0055 600/117 |

\* cited by examiner

*Primary Examiner* — Rina Duda

(57) ABSTRACT

A method for servo locking control is provided. A servo enters a first lock state, and determines whether the current angular deflection values of the servo in a first preset period are all greater than a preset angular deflection value. When the current angular deflection values of the servo in the first preset period are all greater than the preset angular deflection value, the servo enters a second lock state, and determines whether the current angular changing values of the servo in a second preset period are all less than a preset angular changing value. When the current angular changing values of the servo in the second preset period are all less than the preset angular changing value, the servo enters the first lock state. A servo for performing the method for servo locking control is also provided.

12 Claims, 5 Drawing Sheets

METHOD FOR SERVO LOCKING CONTROL AND SERVO

CROSS REFERENCE TO RELATED APPLICATIONS

This application claims priority to Chinese Patent Application No. 201610544019.1, filed Jul. 8, 2016, which is hereby incorporated by reference herein as if set forth in its entirety.

BACKGROUND

Technical Field

The present disclosure relates to robot servo technology, and more particularly to a method for servo locking control and a servo.

Description of Related Art

Robot is a machine that can perform appropriate actions according to control instructions from a control unit. A servo is a driving component of the robot and also a key component constructing robots joint. When performing actions, the robot need to rotate servo gears to specific positions and lock them in positions. The position locking process is accomplished through a main control circuit and an angular sensor inside the servo. However, this locking control method can only accomplished by cooperation of the main control circuit and the angular sensor, which is unduly inconvenient.

SUMMARY

A method for servo locking control includes: controlling a servo to enter a first lock state; determining whether current angular deflection values of the servo in a first preset period are all greater than a preset angular deflection value; controlling the servo to enter a second lock state, when the current angular deflection values of the servo in the first preset period are all greater than the preset angular deflection value; determining whether current angular changing values of the servo in a second preset period are all less than a preset angular changing value, and controlling the servo to enter the first lock state, when the current angular changing values of the servo in the second preset period are all less than the preset angular changing value.

A servo includes a main control circuit, an actuating motor, an angular sensor, a reduction gear, and an output axis. The angular sensor acquires and outputs angular information. The main control circuit controls the actuating motor to work through the reduction gear and the output axis by performing the method for servo locking control.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
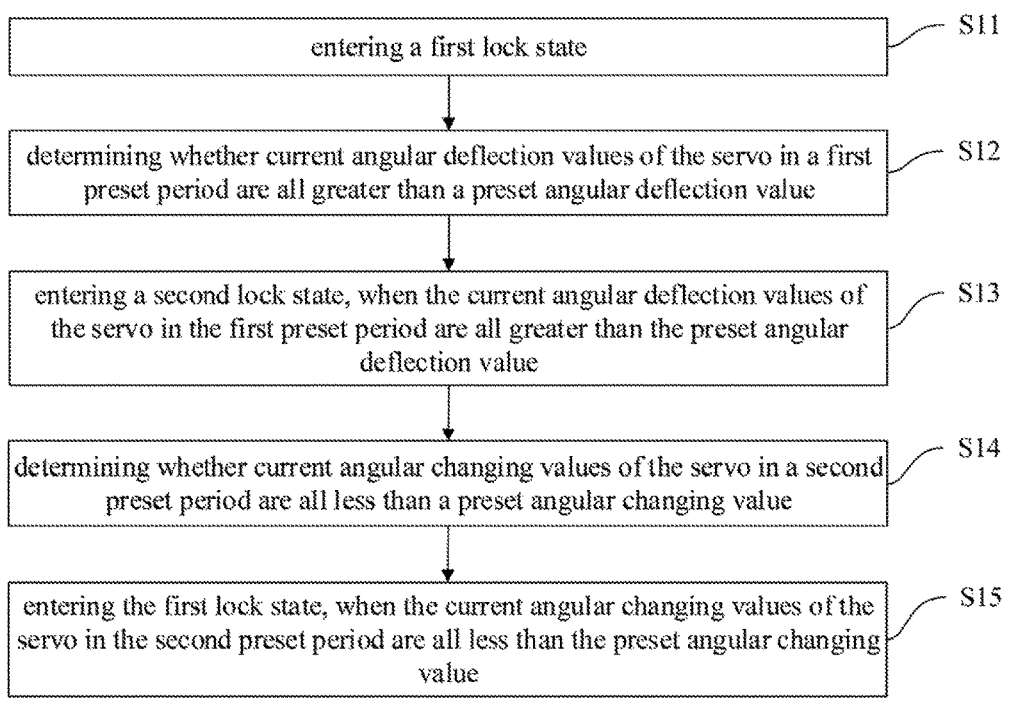
FIG. 1 is a flowchart of a first embodiment of a method for locking control of a servo in accordance with the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

FIG. 1 is a flowchart of a first embodiment of a method for locking control of a servo in accordance with the present disclosure. As shown in FIG. 1, in the present embodiment, the locking control method includes the following steps.

In step S11, entering a first lock state. Specifically, a servo receives a first locking instruction from the control unit after powered up, and enters the first lock state according to the first locking instruction. The first lock state is a secure lock state. The secure lock state is one where a main control circuit of the servo controls gears of the servo to move to a target locking position that corresponds to a target value and then remain in the target locking position. When the position of the gears deviates from the target locking position, the output torque of the gears is controlled to exert a force on the gears. The direction of the force is opposite to the direction of the gears rotation, thereby remaining the gears in the target locking position until a new locking instruction is received.

In step S12, determining whether current angular deflection values of the servo in a first preset period are all greater than a preset angular deflection value. Current angular deflection value is an absolute value of difference between a current angular value and a latest target locking value. The preset angular deflection value is an angular deflection value used to determine whether the position of the gears deviates from the target locking position. When the current angular deflection value is greater than the preset angular deflection value, it indicates that a relative great external force is applying on the gears and making the gears deviate from the target locking position.

In step S13, entering a second lock state, when the current angular deflection values of the servo in the first preset period are all greater than the preset angular deflection value. The second lock state is a weak lock state. The weak lock state is one where the main control circuit controls the gears to move to the target locking position, and then reduces the output torque of the gears and changes the target locking position of the servo to make the target locking position change with the current angular values, when an external force applying on the gears for a long time greater than a preset force is detected. The preset force makes the current angular deflection values of the gears relative to the target locking position greater than the preset angular deflection value.

Understandably, if the current angular deflection value is greater than the preset angular deflection value, it indicates that a relative greater external force is applying on the servo and making the servo deviate from the target locking position. If the current angular deflection values that were computed according to the acquired current angular values in the first preset period are all greater than the preset angular deflection value, it indicates that there has always been an external force applying on the servo within the first preset period to make the servo deviate from the target locking position for a long time. It causes the servo to switch from the secure lock state to the weak lock state.

In step S14, determining whether current angular changing values of the servo in a second preset period are all less than a preset angular changing value. Current angular changing value is an absolute value of difference between a current angular value acquired at this time and an angular value acquired at the last time. The preset angular changing value is a reference value used to determine the output angle variation degree of the gears. If the current angular changing value is less than the preset angular changing value, which means the differential value between the current angular value acquired at this time and the angular value acquired at the last time is small, the gears stay still.

In step S15, entering the first lock state, when the current angular changing values of the servo in the second preset period are all less than the preset angular changing value. Understandably, if the current angular changing values of the servo in the second preset period are all less than the preset angular changing value, it indicates that the angular of the gears are currently in a relatively stable state. The main control circuit of the servo now resets the output torque of the servo to make the servo enter the first lock state. It helps to maintain the servo in proper order.

The method provided by the embodiment of the invention can make the current angular deflection values of the servo in the first preset period are all greater than the preset angular deflection value through the imposition of external force, that is, makes the servo to switch from the secure lock state to the weak lock state, and makes the servo to switch to the secure lock state when the current angular changing values of the servo in the second preset period are all less than the preset angular changing value. The method can control the current angular values of the servo through the imposition of external force to realize the gears locking control. The servo can flexible transition from the secure lock state to the weak lock state. The control method is both simple and flexible.

Embodiment 2

Figure 2:
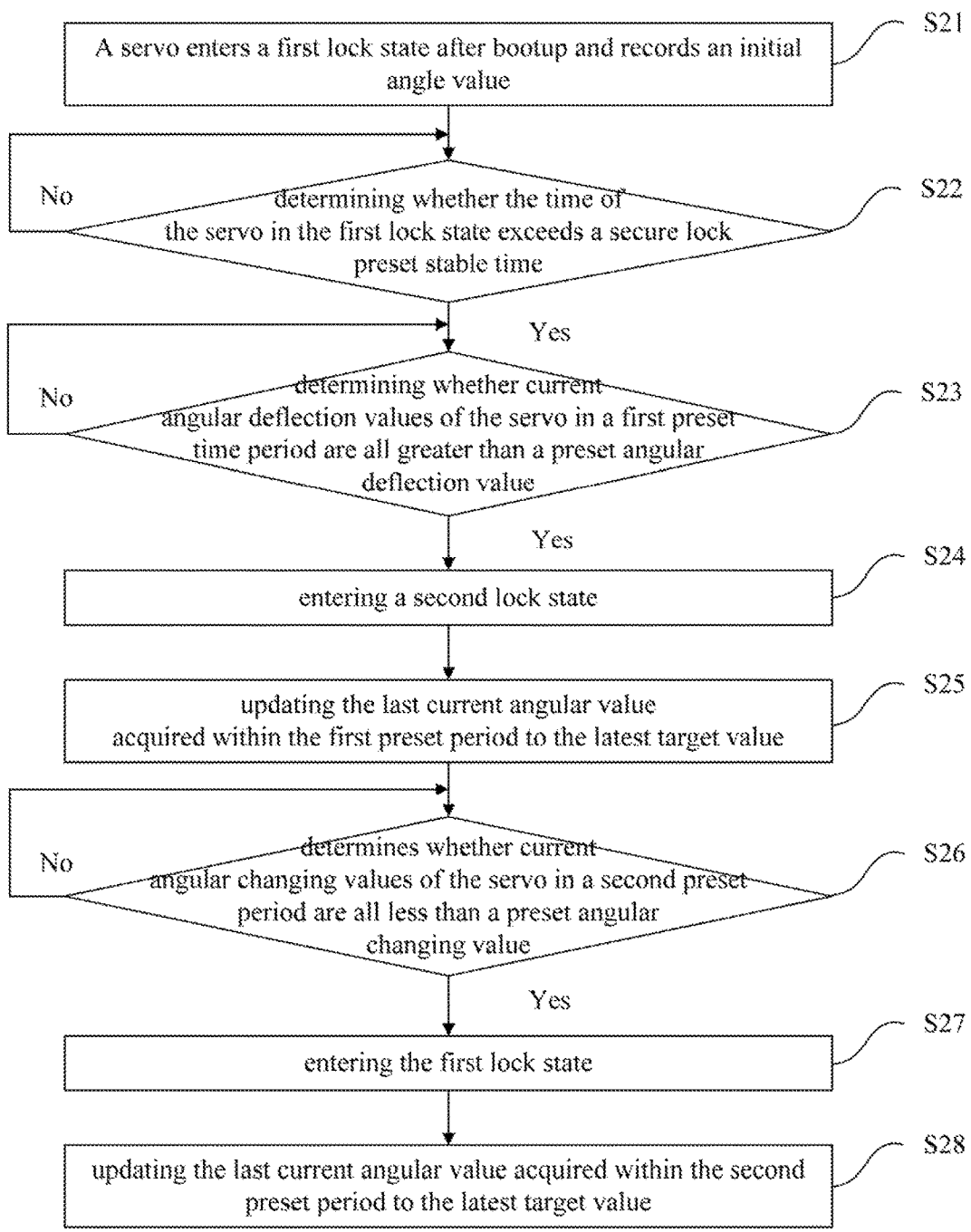
FIG. 2 is a flowchart of a second embodiment of a method for locking control of a servo in accordance with the present disclosure.
Figure 3:
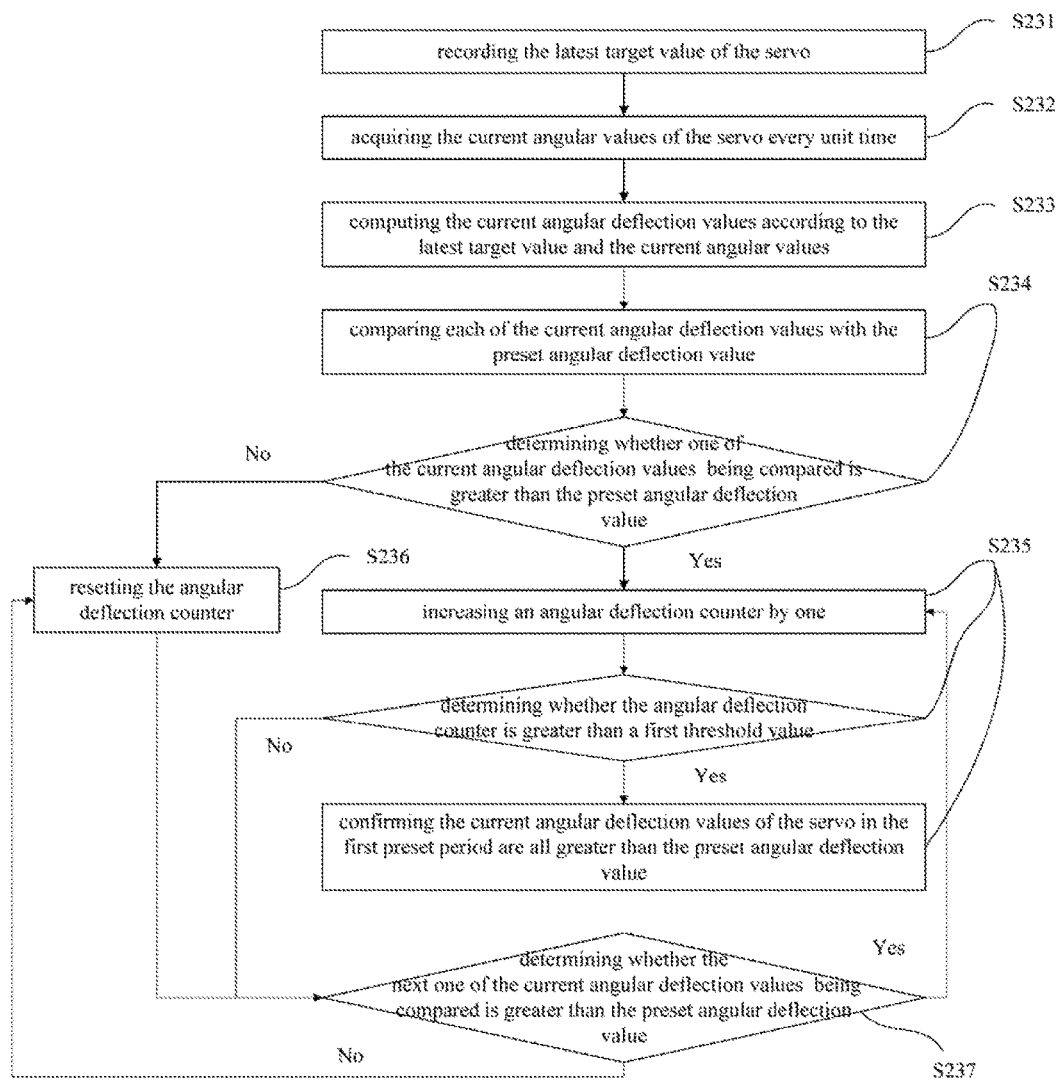
FIG. 3 is a part flowchart of the second embodiment of FIG. 2.
Figure 4:
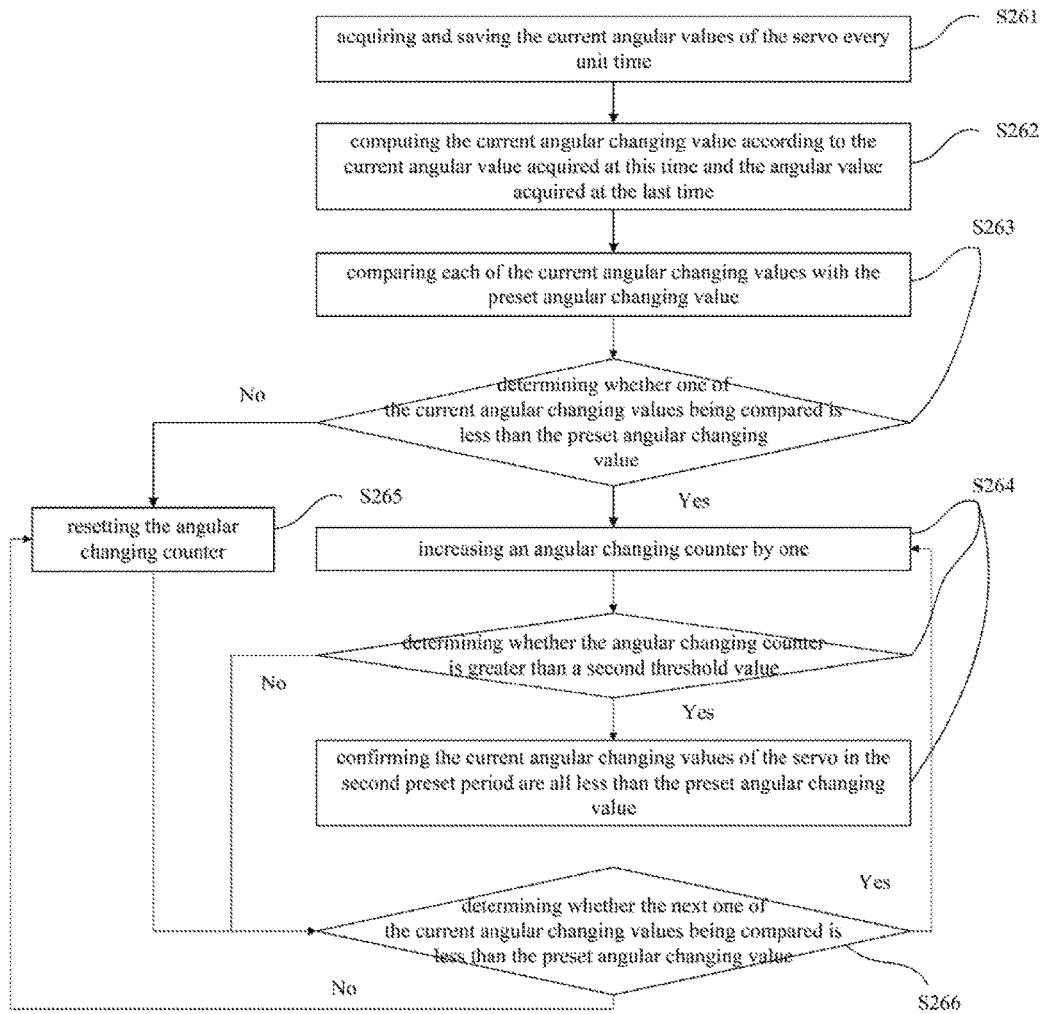
FIG. 4 is another part local flowchart of the second embodiment of FIG. 2.

FIG. 2 is a flowchart of a second embodiment of a method for locking control of a servo in accordance with the present disclosure. As shown in FIG. 2, in the present embodiment, the locking control method includes the following steps.

In step S21, entering a first lock state. Specifically, a servo receives a first locking instruction from the control unit after powered up, enters the first lock state according to the first locking instruction, and records the latest target value $\alpha0$ when the servo enters the first lock state. The first lock state is a secure lock state. The secure lock state is one where a main control circuit of the servo controls gears of the servo to move to a target locking position that corresponds to a target value and then remain in the target locking position. When the position of the gears deviates from the target locking position, the output torque of the gears is controlled to exert a force on the gears. The direction of the force is opposite to the direction of the gears rotation, thereby remaining the gears in the target locking position until a new locking instruction is received.

In step S22, determining whether the time of the servo in the first lock state exceeds a secure lock preset stable time, when the servo enters the first lock state. When the time of the servo in the first lock state exceeds the secure lock preset stable time, performs the step S23. In step S23, determining whether current angular deflection values $\varepsilon1$ of the servo in a first preset period $\Delta t1$ are all greater than a preset angular deflection value $\varepsilon0$. When the time of the servo in the first lock state does not exceed the secure lock preset stable time, makes the servo to maintain the first lock state and performs the step S22. Understandably, the servo may have large amplitude swing movement during the servo bootup. That makes the servo may not be adequately locked in the default position after entering the first lock state. So the servo needs to wait for some time (that is, the secure lock preset stable time) after entering the first lock state to stabilise the servo locking, and then determines whether there is a greater external force that makes the current angular deflection values $\varepsilon1$ in the first preset period $\Delta t1$ are all greater than the preset angular deflection value $\varepsilon0$. Understandably, it can effectively prevent the servo from entering the weak lock state because of error detecting during the servo bootup, by setting the step S22. The error detecting is because of the servo cannot be adequately locked in the default position when entering the first lock state during the servo bootup. This will affect servo performance.

In step S23, determining whether current angular deflection values $\varepsilon1$ of the servo in a first preset time period $\Delta t1$ are all greater than a preset angular deflection value $\varepsilon0$. The preset angular deflection value $\varepsilon0$ is an angular deflection value used to determine whether the position of the gears deviates from the target locking position. When the current angular deflection value $\varepsilon1$ is greater than the preset angular deflection value $\varepsilon0$, it indicates that a relative greater external force is applying on the servo and making the servo deviate from the target locking position. If the current angular deflection values $\varepsilon1$ in the first preset period $\Delta t1$ that were computed according to the acquired current angular values $\beta1$ are all greater than the preset angular deflection value $\varepsilon0$, it indicates that there has always been an external force applying on the servo within the first preset period $\Delta t1$ to make the servo deviate from the target locking position for a long time. Thus, the servo controls the servo to switch from the secure lock state to the weak lock state. Understandably, the servo repeats the step S23 after entering the first lock state to determine whether the current angular deflection values $\varepsilon1$ acquired within the first preset period $\Delta t1$ (continuous period of time) are all greater than the preset angular deflection value $\varepsilon0$. In the present embodiment, step S23 includes the following steps.

In step S231, recording the latest target value of the servo $\alpha0$. Understandably, when the servo enters the first lock state, the servo records the latest target value $\alpha0$ of the servo.

In step S232, acquiring the current angular values $\beta1$ of the servo every unit time t1.

In step S233, computing the current angular deflection values $\varepsilon1$ according to the latest target value $\alpha0$ and the current angular values $\beta1$. Specifically, the servo acquires and saves the current angular values $\beta1$ of the servo by the angular sensor installed in the servo every unit time t1, and computes the current angular deflection values $\varepsilon1$. The current angular deflection value $\varepsilon1$ is an absolute value of difference between the current angular value $\beta1$ and the latest target value $\alpha0$, that is, $\varepsilon1=|\beta1-\alpha0|$.

In step S234, comparing each of the current angular deflection values $\varepsilon 1$ with the preset angular deflection value $\varepsilon 0$, and determining whether one of the current angular deflection values $\varepsilon 1$ being compared is greater than the preset angular deflection value $\varepsilon 0$.

In step S235, increasing an angular deflection counter $n1$ by one, when the one of the current angular deflection values $\varepsilon 1$ being compared is greater than the preset angular deflection value $\varepsilon 0$, and determining whether the angular deflection counter $n1$ is greater than a first threshold value $N1$. When the angular deflection counter $n1$ is greater than the first threshold value $N1$, confirms the current angular deflection values $\varepsilon 1$ of the servo in the first preset period $\Delta t1$ are all greater than the preset angular deflection value $\varepsilon 0$. Understandably, the current angular deflection value $\varepsilon 1$ is an absolute value of difference between the current angular value $\beta 1$ and the latest target value $\alpha 0$, and the current angular values $\beta 1$ is acquired every unit time $t1$. When the current angular deflection value $\varepsilon 1$ is greater than the preset angular deflection value $\varepsilon 0$, the servo increases the angular deflection counter $n1$ by one. Therefore a target time can be obtained by multiplying the unit time $t1$ with the angular deflection counter $n1$. The target time is required when the current angular deflection values $\varepsilon 1$ are all greater than the preset angular deflection value $\varepsilon 0$. It can be determined whether the current angular deflection values $\varepsilon 1$ in the first preset period $\Delta t1$ are all greater than the preset angular deflection value $\varepsilon 0$ by comparing the target time with the first preset period $\Delta t1$. The first threshold value $N1$ can be a quotient acquired by dividing the first preset period $\Delta t1$ by the unit time $t1$. It can be determined whether the current angular deflection values $\varepsilon 1$ in a first preset period $\Delta t1$ are all greater than the preset angular deflection value $\varepsilon 0$, by determining whether the angular deflection counter $n1$ is greater than the first threshold value $N1$. Computational process is simple and convenience.

In the step S236, resetting the angular deflection counter $n1$ and determining whether the current angular deflection value $\varepsilon 1$ acquired at the next unit time is greater than the preset angular changing value $\varepsilon 0$, when the one of the current angular deflection values $\varepsilon 1$ being compared is not greater than the preset angular deflection value $\varepsilon 0$. Understandably, it is impossible that the current angular deflection values $\varepsilon 1$ acquired within the first preset period $\Delta t1$ are all greater than the preset angular deflection value $\varepsilon 0$, when the current angular deflection value $\varepsilon 1$ acquired at any unit time is not greater than the preset angular deflection value $\varepsilon 0$. Therefore, the servo resets the angular deflection counter $n1$, and determines whether the current angular deflection value $\varepsilon 1$ acquired at the next unit time is greater than the preset angular deflection value $\varepsilon 0$.

In the step S237, determining whether the current angular deflection value $\varepsilon 1$ acquired at the next unit time is greater than the preset angular deflection value $\varepsilon 0$, when the angular deflection counter $n1$ is not greater than the first threshold value $N1$. Understandably, it can be determined that the current angular deflection values $\varepsilon 1$ acquired within the first preset period $\Delta t1$ are all greater than the preset angular deflection value $\varepsilon 0$ as long as the angular deflection counter $n1$ is greater than the first threshold value $N1$. Accordingly, if the angular deflection counter $n1$ is not greater than the first threshold value $N1$, then it will need to determine whether the current angular deflection value $\varepsilon 1$ acquired at the next unit time is greater than the preset angular deflection value $\varepsilon 0$, until the angular deflection counter $n1$ is greater than the first threshold value $N1$.

In step S24, entering a second lock state, when the current angular deflection values $\varepsilon 1$ of the servo in the first preset period $\Delta t1$ are all greater than the preset angular deflection value $\varepsilon 0$. The second lock state is a weak lock state. That means the current angular deflection values $\varepsilon 1$ acquired within the first preset period $\Delta t1$ which is the consecutive time are all greater than the preset angular deflection value $\varepsilon 0$. Understandably, the weak lock state is one where the main control circuit controls the gears to move to the target locking position, and then reduces the output torque of the gears and changes the target locking position of the servo to make the target locking position change with the current angular values $\beta 1$, when an external force applying on the gears for a long time greater than a preset force is detected. The preset force makes the current angular deflection values $\varepsilon 1$ of the gears relative to the target locking position greater than the preset angular deflection value $\varepsilon 0$. Understandably, the servo does not enter the weak lock state and performs the step S23, when any of the current angular deflection values $\varepsilon 1$ in the first preset period $\Delta t1$ is not greater than the preset angular deflection value $\varepsilon 0$.

Understandably, when the servo is in the secure lock state, if the current angular deflection values $\varepsilon 1$ in the first preset period $\Delta t1$ are all greater than the preset angular deflection value $\varepsilon 0$, the servo switches from the secure lock state to the weak lock state, and updates the last current angular value $\beta 1$ acquired within the first preset period $\Delta t1$ to the latest target value $\alpha 0$. This makes the servo transition from the secure lock state to the weak lock state flexibly, and makes the servo flexibility and easier to control.

In step S25, updating the last current angular value $\beta 1$ acquired within the first preset period $\Delta t1$ to the latest target value $\alpha 0$. At the next unit time $t1$, the servo updates the last current angular value $\beta 1$ acquired within the first preset period $\Delta t1$ to the latest target value $\alpha 0$.

In step S26, determining whether the current angular changing values $\theta 1$ of the servo in a second preset period $\Delta t2$ are all less than a preset angular changing value $\theta 0$. Current angular changing value $\theta 1$ is an absolute value of difference between a current angular value acquired at this time and an angular value acquired at the last time. The preset angular changing value $\theta 0$ is a reference value used to determine the output angle variation degree of the gears. When the current angular changing value $\theta 1$ is less than the preset angular changing value $\theta 0$, which means the differential value between the current angular value acquired at this time and the angular value acquired at the last time is small, the gears stay still.

In step S261, acquiring and saving the current angular values $\beta 1$ of the servo every unit time $t1$.

In step S262, computing the current angular changing value according to the current angular value acquired at this time and the angular value acquired at the last time. In the embodiment, the current angular value acquired by the angular sensor can be represented as $\beta 1$, the angular value acquired at the last time can be represented as $\beta 0$, the current angular value acquired at the next time can be represented as $\beta 2$. The current angular changing value $\theta 1$ is an absolute value of difference between the current angular value $\beta 1$ acquired at this time and the angular value $\beta 0$ acquired at the last time, that is, $\theta 1 = |\beta 1 - \beta 0|$.

In step S263, comparing each of the current angular changing values $\theta 1$ with the preset angular changing value $\theta 0$, and determining whether one of the current angular changing values $\theta 1$ being compared is less than the preset angular changing value $\theta 0$.

In step S264, increasing an angular changing counter n2 by one and determining whether the angular changing counter n2 is greater than a second threshold value N2, when the one of the current angular changing values $\theta 1$ being compared is less than the preset angular changing value $\theta 1$. When the angular changing counter n2 is greater than the second threshold value N2, confirms the current angular changing values $\theta 1$ of the servo in the second preset period $\Delta t2$ are all less than the preset angular changing value $\theta 0$. Understandably, the current angular changing value $\theta 1$ is an absolute value of difference between the current angular value $\beta 1$ acquired at this time and the angular value $\beta 0$ acquired at the last time. The current angular values $\beta 1$ is acquired every unit time t1. The servo increases the angular changing counter n2 by one, when the current angular changing value $\theta 1$ is less than the preset angular changing value $\theta 0$. Therefore a target time can be obtained by multiplying the unit time t1 with the angular changing counter n2. The target time is required when the current angular changing values are all less than the preset angular changing value $\theta 0$. It can be determined whether the current angular changing values $\theta 1$ in the second preset period $\Delta t2$ are all less than the preset angular changing value $\theta 0$, by comparing the target time with the second preset period $\Delta t2$. The second threshold value N2 can be a quotient acquired by dividing the second preset period $\Delta t2$ by the unit time t1. It can be determined whether the current angular changing values $\theta 1$ in the second preset period $\Delta t2$ are all less than the preset angular changing value $\theta 0$, by determining whether the angular changing counter n2 is greater than the second threshold value N2.

In step S265, resetting the angular changing counter n2 and determining whether the current angular changing value $\theta 1$ acquired at the next unit time is less than the preset angular changing value $\theta 0$, when the one of the current angular changing values $\theta 1$ being compared is less than the preset angular changing value $\theta 1$. Understandably, it is impossible that the current angular changing values $\theta 1$ acquired within the second preset period $\Delta t2$ are all less than the preset angular changing value $\theta 2$, when the current angular changing value $\theta 1$ acquired at any unit time is not less than the preset angular changing value $\theta 0$. Therefore the servo resets the angular changing counter n2, and determines whether the current angular changing value $\theta 1$ acquired at the next unit time is less than the preset angular changing value $\theta 0$.

In step S266, determining whether the current angular changing value $\theta 1$ acquired at the next unit time is less than the preset angular changing value $\theta 0$, when the angular changing counter n2 is not greater than the second threshold value N2. Understandably, it can be determined that the current angular changing values $\theta 1$ acquired within the second preset period $\Delta t2$ are all less than the preset angular changing value $\theta 0$ as long as the angular changing counter n2 is greater than the second threshold value N2. Accordingly, the servo determines whether the current angular changing value $\theta 1$ acquired at the next unit time is less than the preset angular changing value $\theta 0$, when the angular changing counter n2 is not greater than the second threshold value N2.

In step S27, entering the first lock state, when the current angular changing values $\theta 1$ of the servo in the second preset period $\Delta t2$ are all less than the preset angular changing value $\theta 0$. If the current angular changing values $\theta 1$ of the servo in the second preset period $\Delta t2$ are all less than the preset angular changing value $\theta 0$, then the current angular changing values $\theta 1$ of the servo acquired within the second preset period $\Delta t2$ are all less than the preset angular changing value $\theta 2$. That means the angle of the gears is in a stable state. The servo now resets the output torque of the servo to make the servo to enter the first lock state. It helps to maintain the servo in proper order. Understandably, if any of the current angular changing values $\theta 1$ in the second preset period $\Delta t2$ is not less than the preset angular changing value $\theta 0$, then performs the step S26.

In step S28, updating the last current angular value acquired within the second preset period $\Delta t2$ to the latest target value $\alpha 0$. The servo uses the absolute value of difference between the current angular value $\beta 1$ and updated latest target value as the current angular deflection value $\epsilon 1$, when acquiring the current angular value at the next unit time and computing the current angular deflection value $\epsilon 1$.

Understandably, when the servo is in the weak lock state, if the current angular changing values $\theta 1$ of the servo in the second preset period $\Delta t2$ are all less than the preset angular changing value $\theta 0$, then the servo switches from the weak lock state to the secure lock state, and updates the last current angular value acquired within the second preset period $\Delta t2$ to the latest target value $\alpha 0$. This makes the servo transition from the weak lock state to the secure lock state flexibly, and makes the servo flexibility and easier to control.

The method provided by the embodiment of the invention can make the current angular deflection values $\epsilon 1$ of the servo in the first preset period $\Delta t1$ are all greater than the preset angular deflection value $\epsilon 0$ through the imposition of external force, that is, makes the servo to switch from the secure lock state to the weak lock state, and makes the switch to the secure lock state when the current angular changing values $\theta 1$ of the servo in the second preset period $\Delta t2$ are all less than the preset angular changing value $\theta 0$. The method controls the gears of the servo to switch between the secure lock state and the weak lock state through the imposition of external force. The control method is both simple and flexible, and makes the servo can meet the demands in use.

Embodiment 3

Figure 5:
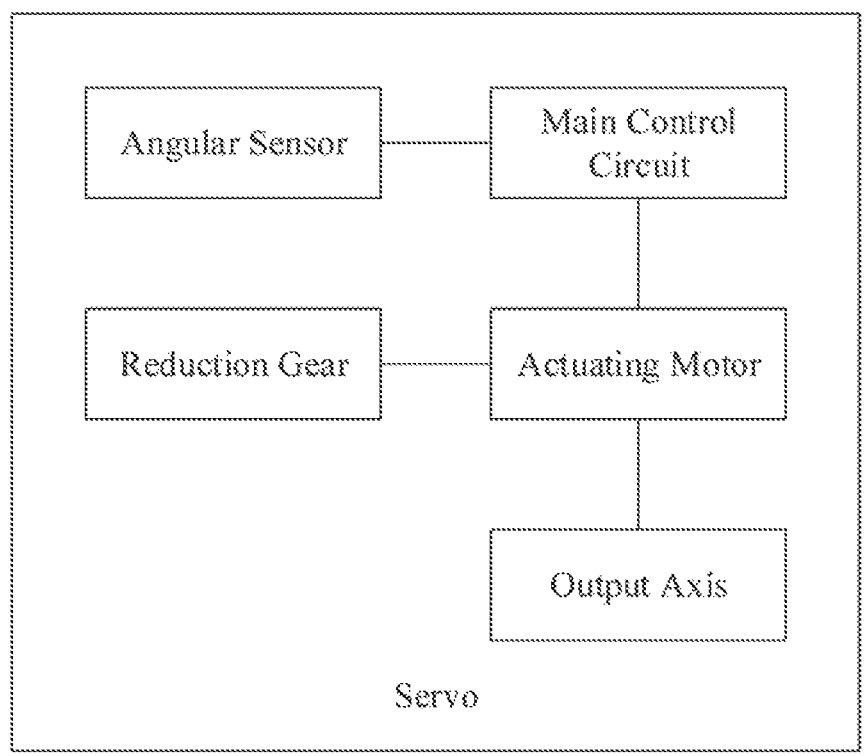
FIG. 5 is a schematic view of a servo according to an embodiment of the present invention.

FIG. 5 is a schematic view of a servo according to an embodiment of the present invention. Referring also to FIG. 1, the present embodiment, a servo can be used to perform the method for locking control of the servo of the embodiments above. The servo includes a main control circuit, an actuating motor, an angular sensor, a reduction gear, and an output axis. The angular sensor acquires and outputs angular information. The main control circuit controls the actuating motor to work through the reduction gear and the output axis by performing the method for locking control of the servo of the described embodiments. The main control circuit of the servo can control the gears of the servo to switch between the first lock state and the second lock state by performing the method for locking control of the servo above. The control method is both simple and flexible, and enables the servo meet the demands in use.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A method for locking control of a servo, the method comprising:

controlling the servo to enter a first lock state in response to an output axis of the servo being in a target locking position, wherein in the first lock state a main control circuit of the servo controls the output axis of the servo to remain in the target locking position;

determining whether current angular deflection values of the servo in a first preset period are all greater than a preset angular deflection value, wherein each current angular deflection value is an absolute value of difference between a current angular value and a latest target locking position value of the servo;

controlling the servo to enter a second lock state from the first lock state, in response to the current angular deflection values of the servo in the first preset period being all greater than the preset angular deflection value, wherein in the second lock state the target locking position is changed with the current angular values;

determining whether current angular changing values of the servo in a second preset period are all less than a preset angular changing value; and controlling the servo to enter the first lock state from the second lock state, in response to the current angular changing values of the servo in the second preset period being all less than the preset angular changing value.

2. The method as described in claim 1, after controlling the servo to enter a first lock state, further comprising:
determining whether the time of the servo in the first lock state exceeds a secure lock preset stable time;
determining whether the current angular deflection values of the servo in the first preset period are all greater than the preset angular deflection value, in response to the time of the servo in the first lock state exceeding the secure lock preset stable time; and
repeatedly determining whether the time of the servo in the first lock state exceeds the secure lock preset stable time, in response to the time of the servo in the first lock state not exceeding the secure lock preset stable time.

3. The method as described in claim 1, wherein determining whether the current angular deflection values of the servo in a first preset period are all greater than a preset angular deflection value comprises:
recording the latest target locking position value of the servo;
acquiring and saving the current angular values of the servo every unit time; and
computing the current angular deflection values according to the latest target locking position value and the current angular values.

4. The method as described in claim 3, further comprising:
comparing each of the current angular deflection values with the preset angular deflection value;
determining whether one of the current angular deflection values being compared is greater than the preset angular deflection value;
increasing an angular deflection counter by one and determining whether the angular deflection counter is greater than a first threshold value, in response to the one of the current angular deflection values being compared being greater than the preset angular deflection value; and
confirming the current angular deflection values of the servo in the first preset period are all greater than the preset angular deflection value, in response to the angular deflection counter being greater than the first threshold value.

5. The method as described in claim 4, wherein determining whether the current angular deflection values of the servo in a first preset period are all greater than a preset angular deflection value, further comprises:
resetting the angular deflection counter and determining whether the current angular deflection value acquired at the next unit time is greater than the preset angular deflection value, in response to the one of the current angular deflection values being compared being not greater than the preset angular deflection value; and
determining whether the current angular deflection value acquired at the next unit time is greater than the preset angular deflection value, in response to the angular deflection counter being not greater than the first threshold value.

6. The method as described in claim 3, after controlling the servo to enter a second lock state, further comprising:
updating the last current angular value acquired within the first preset period to the latest target locking position value.

7. The method as described in claim 5, wherein determining whether the current angular changing values of the servo in a second preset period are all less than a preset angular changing value comprises:
acquiring and saving the current angular values of the servo every unit time; and
computing the current angular changing value according to a current angular value acquired at this time and an angular value acquired at the last time.

8. The method as described in claim 7, further comprising:
comparing each of the current angular changing values with the preset angular changing value;
determining whether one of the current angular changing values being compared is less than the preset angular changing value;
increasing an angular changing counter by one and determining whether the angular changing counter is greater than a second threshold value, in response to the one of the current angular changing values being compared being less than the preset angular changing value; and
confirming the current angular changing values of the servo in the second preset period are all less than the preset angular changing value, in response to the angular changing counter being greater than the second threshold value.

9. The method as described in claim 8, further comprising:
resetting the angular changing counter and determining whether the current angular changing value acquired at the next unit time is less than the preset angular changing value, in response to the current angular changing value being not less than the preset angular changing value; or
determining whether the current angular changing value acquired at the next unit time is less than the preset angular changing value, in response to the angular changing counter being not greater than the second threshold value.

10. The method as described in claim 7, after controlling the servo to enter a first lock state, further comprising:
updating the last current angular value acquired within the second preset period to the latest target locking position value.

11. A servo for performing the method according to claim 1, the servo comprising:
a main control circuit, an actuating motor, an angular sensor, a reduction gear, and an output axis;
the angular sensor configured for acquiring and outputting angular information;

the main control circuit configured for controlling the actuating motor to work through the reduction gear and the output axis by performing the method for locking control of a servo.

12. The method as described in claim 7, wherein the current angular changing value is an absolute value of difference between the current angular value and the angular value acquired at the last time.

\* \* \* \* \*